United States Patent
Yamamoto et al.

(10) Patent No.: US 9,320,110 B2
(45) Date of Patent: Apr. 19, 2016

(54) LIGHTING DEVICE AND ILLUMINATION APPARATUS INCLUDING SAME

(71) Applicant: Panasonic Corporation, Osaka (JP)

(72) Inventors: Masafumi Yamamoto, Hyogo (JP); Katunobu Hamamoto, Osaka (JP); Hiroyuki Asano, Hyogo (JP); Hisaya Takikita, Osaka (JP); Yuji Yoshimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 612 days.

(21) Appl. No.: 13/717,936

(22) Filed: Dec. 18, 2012

(65) Prior Publication Data

US 2013/0154497 A1  Jun. 20, 2013

(30) Foreign Application Priority Data

Dec. 19, 2011 (JP) ................................. 2011-277389

(51) Int. Cl.
*H05B 37/02* (2006.01)
*H05B 33/08* (2006.01)

(52) U.S. Cl.
CPC ............ *H05B 37/02* (2013.01); *H05B 33/0815* (2013.01); *H05B 33/0845* (2013.01); *Y02B 20/346* (2013.01)

(58) Field of Classification Search
CPC ............ H05B 33/0815; H05B 41/295; H05B 41/3925; H05B 33/0887; H05B 33/089; H05B 41/2985; H05B 37/02; H05B 33/0842; H05B 33/0845; H05B 33/0848; H05B 33/0893; H05B 37/0227; H05B 41/36; H05B 41/38
See application file for complete search history.

(56) References Cited

U.S. PATENT DOCUMENTS

2005/0023995 A1* 2/2005 Ohnishi et al. ................ 315/291
2007/0046275 A1   3/2007 Shirai et al.
(Continued)

FOREIGN PATENT DOCUMENTS

JP  2002-315311      10/2002
JP  2006-147184 A    6/2006
(Continued)

OTHER PUBLICATIONS

Japanese Office Action dated May 26, 2015 issued in corresponding Japanese Patent Application No. 2011-277389 and English Summary thereof.

(Continued)

*Primary Examiner* — Douglas W Owens
*Assistant Examiner* — Monica C King
(74) *Attorney, Agent, or Firm* — Renner, Otto, Boisselle & Sklar, LLP (57) ABSTRACT

A lighting device includes a voltage conversion circuit having at least a switching element connected to a positive potential side of the output terminals of the DC power source unit, and a drive unit which outputs a drive signal to the switching element. The drive unit has a first impedance element with a first impedance which is determined based on a power consumed by the drive unit before a predetermined time has elapsed after a control power source is supplied. A control capacitor for use in generating the drive signal is charged when the switching element is turned off during an on/off operation of the switching element. The lighting device further includes a second impedance element with a second impedance having a resistance component, which is arranged in a path in which the control capacitor can be charged in DC when the switching element does not perform the on/off operation.

10 Claims, 10 Drawing Sheets

(56) References Cited

U.S. PATENT DOCUMENTS

| | | |
|---|---|---|
| 2007/0182347 A1* | 8/2007 | Shteynberg et al. .......... 315/312 |
| 2011/0156669 A1 | 6/2011 | Ishii |
| 2011/0193495 A1 | 8/2011 | Mishima et al. |
| 2013/0169191 A1* | 7/2013 | Ootsuka et al. ............... 315/308 |
| 2013/0249426 A1* | 9/2013 | Tao ............................... 315/201 |

FOREIGN PATENT DOCUMENTS

| | | |
|---|---|---|
| JP | 2007-68269 | 3/2007 |
| JP | 2011-101452 | 5/2011 |
| JP | 2011-155746 | 8/2011 |
| JP | 2011-165587 | 8/2011 |
| WO | 2011/050421 A1 | 5/2011 |

OTHER PUBLICATIONS

Japanese Office Action dated Jan. 5, 2016 issued in corresponding Japanese Patent Application No. 2011-277389 and English summary thereof.

* cited by examiner

LIGHTING DEVICE AND ILLUMINATION APPARATUS INCLUDING SAME

FIELD OF THE INVENTION

The present invention relates to a lighting device which performs lighting control of a light source, and an illumination apparatus including same.

BACKGROUND OF THE INVENTION

Conventionally, a fluorescent lamp is mainly used as a light source for use in illumination, and an illumination apparatus using an inverter lighting device to perform high frequency lighting has been widely used. However, in recent years, a light emitting diode (LED) has been attracting attention as an electrical light source other than a discharge lamp represented by a fluorescent lamp. The light emitting diode is superior to the fluorescent lamp, particularly, in terms of lifetime, and through the future technical improvements, it is expected to have a luminous efficiency exceeding that of FHF32 (high frequency fluorescent lamp of 32 W), which is a mainstream model of a fluorescent lamp for providing general lighting. However, since the light emitting diode is different from the discharge lamp and is turned on by a lighting circuit for outputting a DC power, it is impossible to use a conventional inverter lighting device as it is, and it requires a dedicated DC power source adapted for the light emitting diode characteristics and the number of light emitting diodes used.

Figure 11:
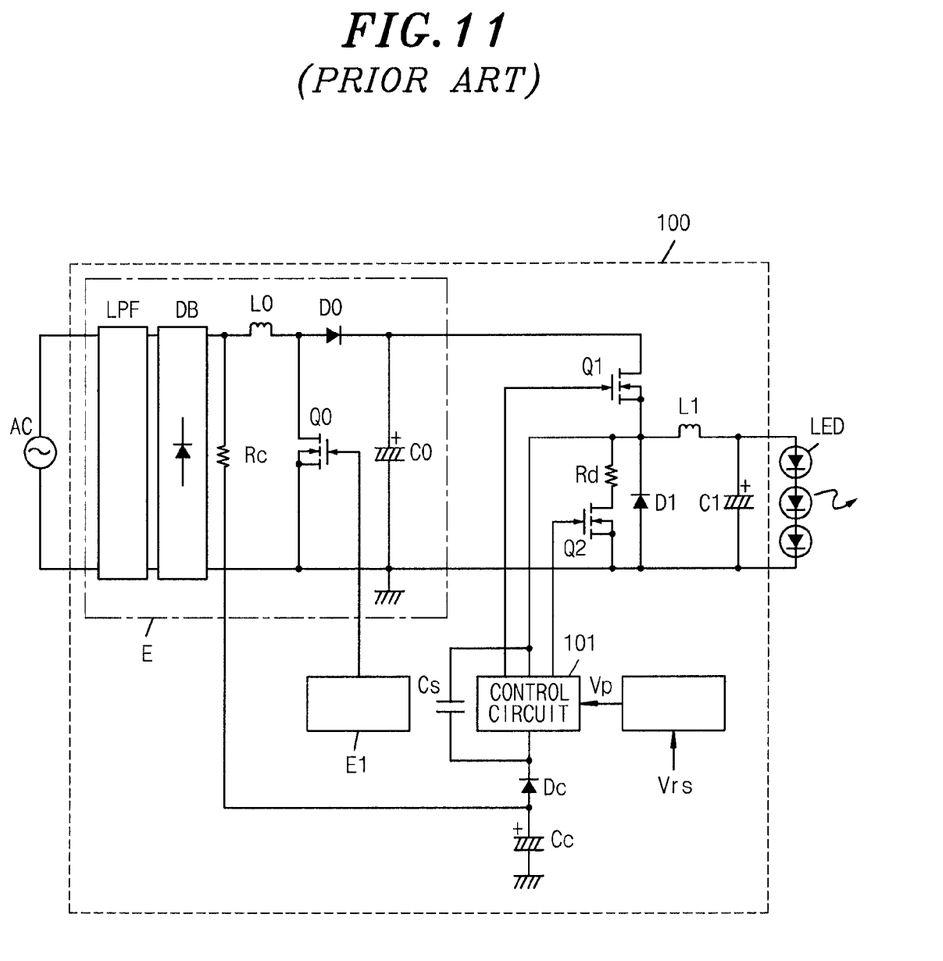
FIG. 11 is a plan view showing a conventional power source device.

FIG. 11 shows a power source device 100 disclosed in Japanese Patent Application Publication No. 2011-155746 (JP2011-155746A). The power source device 100 includes a buck converter including a series circuit of a first switching element Q1 and a diode D1 connected between output terminals of a DC power source E, and a series circuit of an inductor L1 and a capacitor C1 connected between both ends of the diode D1. A control circuit 101 turns on/off the first switching element Q1 by using a driving capacitor Cs as a power source. There is provided a second switching element Q2 which is turned on prior to an ON period in which the first switching element Q1 is driven on and off to cause a short circuit across the diode D1, thereby constituting a charging path to the driving capacitor Cs from a charging capacitor Cc.

In this configuration, there is provided a power source device and an illumination apparatus which can reduce the time required for a voltage across the driving capacitor Cs to be stabilized.

Figure 12:
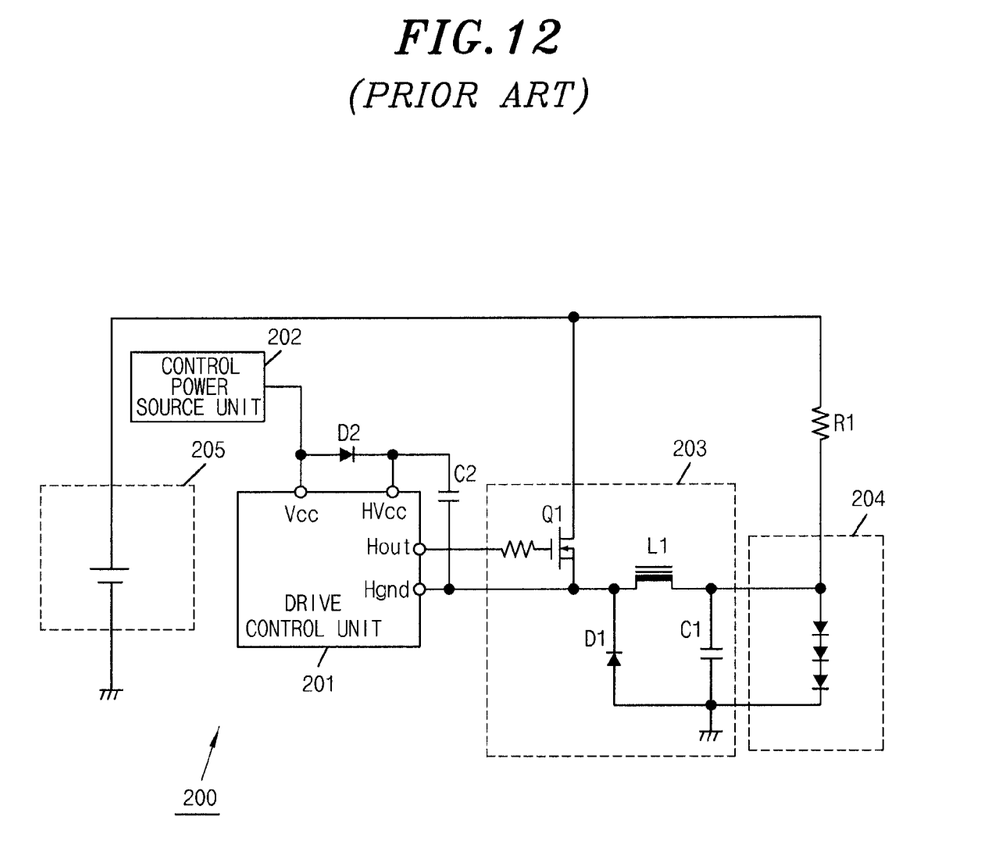
FIG. 12 is a plan view showing a conventional lighting device.

Further, a step-down chopper circuit is known as a typical example of a circuit for outputting a DC power. FIG. 12 shows a lighting device 200 including the step-down chopper circuit, which is disclosed in Japanese Patent Application Publication No. 2011-165587 (JP2011-165587A).

This lighting device 200 includes a control power source unit 202 which supplies a control power source Vcc to a drive control unit 201 which outputs a drive signal to turn on and off a switching element Q1 of a step-down chopper unit 203. The switching element Q1 is connected to a positive potential side of an output terminal of a DC power source unit 205, and an electrical light source (LED module) 204 which is turned on and off by the DC power is connected to a zero potential side of the output terminal of the DC power source unit 205. A capacitor C2 for the control power source, which is used to generate a drive signal of the switching element Q1, is charged by the control power source unit 202 when the switching element Q1 is turned off. An impedance element R1 having a resistance component is connected to a path for supplying a DC current to the electrical light source 204 from the positive potential side of the output terminal of the DC power source unit 205.

The drive control unit 201 has a delay means for outputting a drive signal to turn on and off the switching element Q1 at a predetermined time after the control power source Vcc is supplied.

In this configuration, it is possible to reliably generate a high voltage side control power source by a simple and inexpensive configuration even if the switching element is connected to the positive potential side of the DC power source 205.

In the power source device 100 disclosed in JP2011-155746A, in a portion of the buck converter, two expensive switching elements, i.e., the first switching element Q1 and the second switching element Q2 are required, which may cause a problem in view of manufacturing cost.

On the other hand, in the lighting device 200 disclosed in JP2011-165587A, by providing a simple and inexpensive impedance element (resistance component) R1, it is realized to determine a voltage applied to the LED module 204, i.e., a source voltage of the switching element Q1. However, it is necessary to change the design of the resistance value of the resistance component depending on a load such as the LED module 204, and a large burden/encumbrance occurs in the design and the manufacturing of the lighting device 200.

SUMMARY OF THE INVENTION

In view of the above, the present invention provides a lighting device which has a simple configuration and does not require a design change in resistance value regardless of a load as a light source and an illumination apparatus including same.

In accordance with an aspect of the present invention, there is provided a lighting device including: a voltage conversion circuit which is connected to an electrical light source turned on by a DC current and between output terminals of a DC power source unit, and includes at least a switching element connected to a positive potential side of the output terminals of the DC power source unit; a drive unit configured to output a drive signal for turning on and off the switching element to the switching element, wherein the drive unit has a first impedance element with a first impedance which is determined based on a power consumed by the drive unit before a predetermined time has elapsed after a control power source is supplied to the drive unit; a control capacitor for use in generating the drive signal, which is charged when the switching element is turned off during an on/off operation of the switching element; and a second impedance element with a second impedance having a resistance component, which is arranged in a path in which the control capacitor can be charged in DC when the switching element does not perform the on/off operation.

Further, the second impedance element may be connected to a connection point between the switching element and an inductor.

Further, at least the drive unit and the second impedance element may be configured as a control integrated circuit.

Further, the first impedance of the first impedance element may be greater than the second impedance of the second impedance element.

Further, the first impedance may be at least 10 times greater than the second impedance.

Further, the lighting device described above may further include the electrical light source. The electrical light source may be removably connected to the lighting device.

Further, the electrical light source and the second impedance may be included in a module to be removably connected to the lighting device.

In accordance with another aspect of the present invention, there is provided an illumination apparatus including the lighting device described above.

In accordance with the present invention, there are provided a lighting device which can ensure a drive voltage of a switching element in a simple configuration using a simple element, and does not require a design change in resistance value regardless of the type of a load, and an illumination apparatus including same.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, a lighting device and an illumination apparatus in accordance with embodiments of the present invention will be described in detail with reference to FIGS. 1 to 10.

First Embodiment

Figure 1:
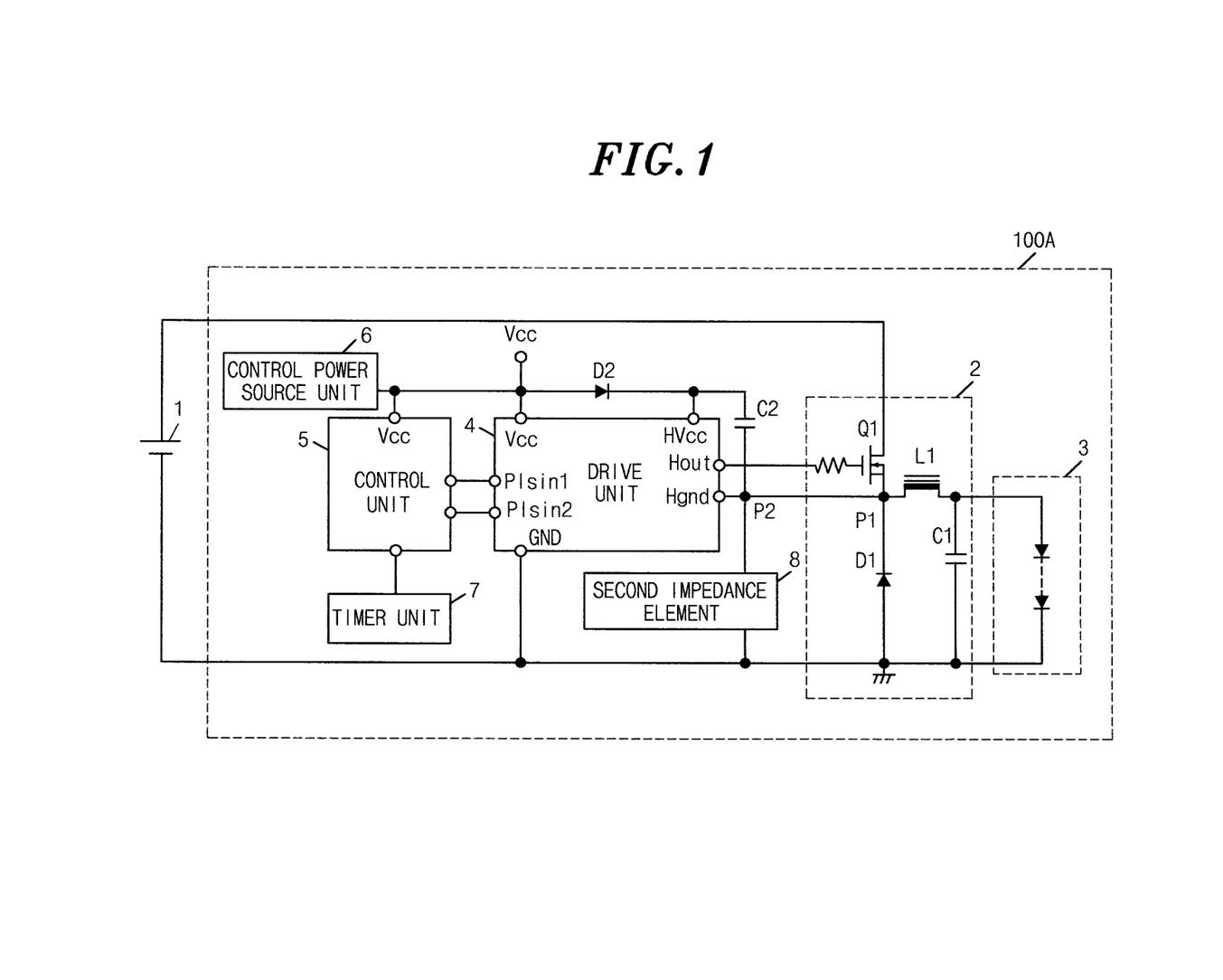
FIG. 1 is a circuit diagram of a lighting device in accordance with a first embodiment of the present invention.

FIG. 1 is a circuit diagram of a lighting device in accordance with a first embodiment of the present invention. The lighting device 100A is connected to an output terminal of a DC power source unit 1, and includes a step-down chopper unit 2, an LED module (electrical light source) 3, a drive unit 4 having first impedance elements 10 which will be described later, a control unit 5, a control power source unit 6, a timer unit 7, a second impedance element 8, a control capacitor C2, and a diode D2.

The step-down chopper unit 2 includes a switching element Q1, an inductor L1, a smoothing capacitor C1 and a diode D1, and functions as a voltage conversion circuit. The switching element Q1 is connected in series to the inductor L1 and the smoothing capacitor C1 while being connected to a positive potential side of a positive voltage output terminal of the DC power source unit 1. A metal oxide semiconductor field effect transistor (MOSFET), insulated gate bipolar transistor (IGBT) or the like is used as the switching element Q1.

The control capacitor C2 functions as a power source for driving the switching element Q1, which will be described in detail later. A potential at a connection point P1 serves as a source potential of the switching element Q1 and corresponds to a midpoint potential, wherein the switching element Q1 itself is provided on a higher voltage side than the midpoint potential. Therefore, a correspondingly high voltage is required to perform the on/off operation (switching operation) of the switching element Q1, and the control capacitor C2 functions as a bootstrap capacitor to obtain such a high voltage.

An LED module (electrical light source) 3, which includes light emitting diodes and is capable of being turned on by a DC current to emit light, is connected in parallel to the capacitor C1. Thus, the switching element Q1, the inductor L1 and the LED module 3 are connected in series.

The DC power source unit 1 may be configured to output a DC voltage which is converted from an AC voltage of, e.g., a commercial AC power source by using a full-wave rectifier, a step-up chopper circuit and the like.

The control unit 5 generates a control signal for controlling the on/off of the switching element Q1 in the step-down chopper unit 2.

The drive unit 4 outputs a drive signal to the switching element Q1 in response to an input of the control signal generated by the control unit 5.

The control power source unit 6 supplies a control power source to at least the drive unit 4 based on the voltage generated at the output terminal of the DC power source unit 1.

After the control power source is supplied to the drive unit 4, the timer unit 7 outputs to the control unit 5 a signal for controlling the on/off of the switching element Q1 after a predetermined time.

When the switching element Q1 does not perform an on/off operation, the second impedance element 8 having a second impedance having a resistance component is arranged in a path in which the control capacitor C2 can be charged in DC from the control power source unit 6. In this embodiment, the second impedance element 8 is connected to the connection point P1 between the switching element Q1 and the inductor L1.

The connection point P1 corresponding to the source potential of the switching element Q1 corresponds to the midpoint potential, and the switching element Q1 itself is provided on a higher voltage side than the midpoint potential. Therefore, in the on/off operation of the switching element Q1, a correspondingly high gate voltage is required (particularly, when a power source voltage Vcc is high), and a bias due to the control capacitor C2 is necessary.

On the other hand, when the switching element Q1 does not perform the on/off operation, i.e., at start-up of the device, it is required to configure such that the potential at the connection point P1, i.e., the potential at a connection point P2 (the same potential as the connection point P1) is reduced as much as possible, particularly, down to a ground level to make a current flow into the control capacitor C2 from the control power source unit 6, thereby charging the control capacitor C2.

Accordingly, in this embodiment, it is configured such that the second impedance element 8 is disposed on the low potential side of the control capacitor C2 as seen from the control power source unit 6, and the control capacitor C2 can be charged in DC when the switching element Q1 does not perform the on/off operation. Since the LED module 3 serving as a load is operated by a DC current, it is possible to employ a simple and inexpensive impedance element as the second impedance element 8, and it is not necessary to use an expensive MOSFET such as that used in JP2011-155746A.

Further, in JP2011-165587A, a current flows through the LED module 3 and the source potential of the switching element is lowered to the potential of the LED module 3 by providing a resistor R1. In this case, it is necessary to adjust and change a value of the resistor R1 depending on the type of the LED module 3 serving as a load, so that a burden of the design and manufacturing of the lighting device is increased.

However, in the present embodiment, by providing the second impedance element 8, there is no need to consider a type of the load of the LED module 3. Accordingly, the burden of the design and manufacturing of the lighting device is not increased in the present embodiment.

Next, the operation of the step-down chopper unit 2 is described. When the switching element Q1 is turned on, a current flows into the LED module 3 through the switching element Q1 and the inductor L1 from the DC power source unit 1. When the switching element Q1 is turned off, the energy stored in the inductor L1 is discharged through the LED module 3 and the diode D1. The on/off frequency of the switching element Q1 is generally several tens of kilohertz (kHz).

The drive unit 4 may have a high withstand voltage drive function to supply a drive signal for turning on and off the switching element Q1 connected to the positive voltage output terminal of the DC power source unit 1 as in a high withstand voltage drive IC (see FIG. 2) configured to output a drive signal for alternately controlling the on/off of two switching elements connected in series in a half-bridge type inverter to be used in a fluorescent lamp ballast, and the drive signal is outputted from a terminal Hout. A control power source voltage outputted from the control power source unit 6 is supplied to a terminal Vcc that is an operation power source terminal of the drive unit 4. The drive unit 4 can be operated when the terminal Vcc has a predetermined control power source voltage with respect to the ground potential (potential of a negative voltage output terminal of the DC power source unit 1).

The drive unit 4 has a terminal HVcc and a terminal Hgnd to generate the control power source of the circuit for outputting the drive signal to the switching element Q1. The control capacitor C2 is connected between the terminal HVcc and the terminal Hgnd, and the terminal Hgnd is connected to the source of the switching element Q1. Accordingly, by reducing the source potential of the switching element Q1 to substantially zero voltage, the control capacitor C2 is charged to a voltage substantially equal to the control power source voltage Vcc through the diode D2 from the control power source unit 6. The circuit for outputting the drive signal to the switching element Q1 is operated by using the voltage charged in the control capacitor C2 as a power source.

Figure 2:
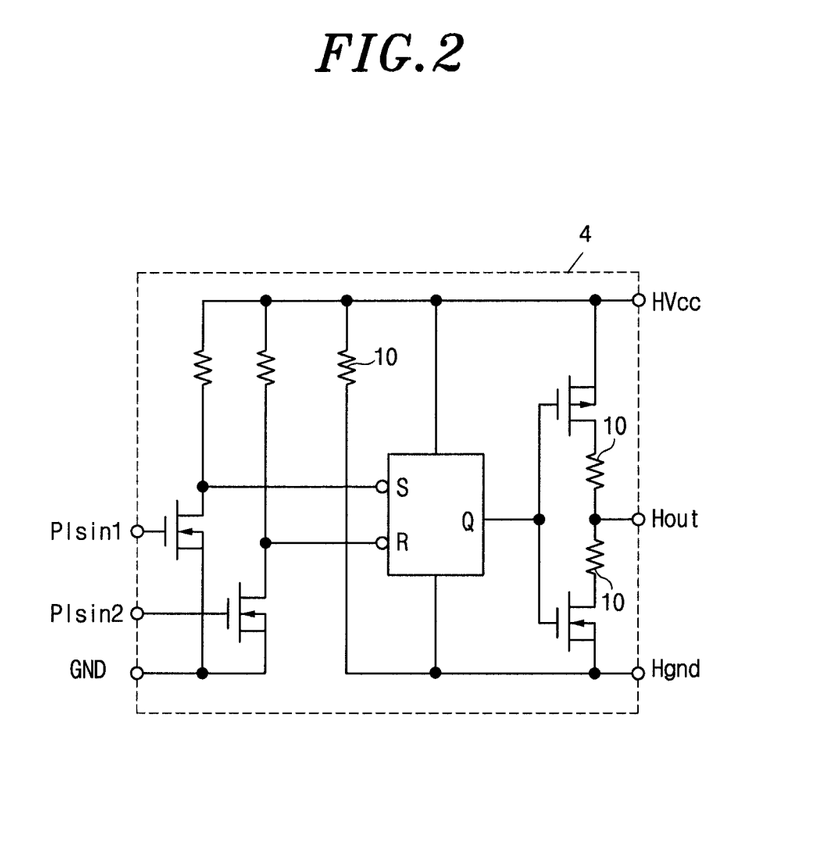
FIG. 2 is a circuit diagram showing an example of a drive unit.

FIG. 2 is a circuit diagram showing an example of the drive unit 4. The drive unit 4 is formed as an integrated circuit (IC) which is commercially available, and a circuit having the basic and additional functions is added between the terminals HVcc and Hgnd. This example shows a general configuration in which, between the terminals HVcc and Hgnd, first impedance elements 10 are provided at a portion between two switching elements (MOSFETs) and at another portion. The first impedance of the first impedance elements 10 is determined based on the power consumed by the drive unit 4. The configuration of providing first impedance elements at such portions shown in FIG. 2 is merely exemplary.

In this case, it is preferable that the first impedance of the first impedance elements 10 is greater than the second impedance of the second impedance element 8 (first impedance>second impedance). This is because if the second impedance is greater, the potential at the connection points P1 and P2 becomes higher by the resistive divider action of the first impedance elements 10 and the second impedance element 8, so that the original intent of reducing the source potential of the switching element Q1 cannot be sufficiently achieved. By the configuration in which the first impedance is set to be greater than the second impedance, it is possible to effectively reduce the potential of the terminal Hgnd, i.e., the source potential of the switching element Q1, so that the switching element Q1 can be used more effectively. Further, a potential difference between the terminals HVcc and Hgnd increases to accumulate sufficient electric charges in the control capacitor C2 connected in parallel to the first impedance elements 10 at the outside of the drive unit 4.

The first impedance of the first impedance elements 10 is determined by the power consumed by the drive unit 4 in the time period (between t0 to t2 in FIG. 3) prior to the normal operation (see (c) and (d) of FIG. 3 to be described later) after the start of the on/off operation of the switching element Q1. For example, in the switching elements (MOSFETs) on both sides of the first impedance elements 10 provided therebetween, there is a possibility that a leakage current is generated even in the OFF state. The leakage current flows between the terminals HVcc and Hgnd, and is generally in a range from several to several tens of microamperes (μA). It is assumed that a leakage current of 20 μA flows between the terminals HVcc and Hgnd in the case where a voltage of 10 V is applied between the terminals HVcc and Hgnd based on the power source Vcc and a drive signal is not outputted from the terminal Hout. In this case, the impedance (first impedance) between the terminals HVcc and Hgnd is 10 V/20 μA=500 kΩ. Thus, it is desirable that the second impedance of the second impedance element 8 is less than 500 kΩ.

Further, as another example, it is assumed that there is added a monitoring circuit which monitors the voltage between the terminals HVcc and Hgnd so as not to output a drive signal if the potential of the terminal Hout is low. On the assumption that the normal operation of the switching element Q1 is not ensured if the potential of the terminal Hout corresponding to the voltage of the switching element Q1 is extremely low, such a monitoring circuit is provided.

When this monitoring circuit is connected to the terminal HVcc, it needs to have a plurality of resistance elements for detecting the voltage between the terminals HVcc and Hgnd, and a reference voltage generating element for comparison of an abnormality determination value or the like. In this case, the impedance (first impedance) between the terminals HVcc and Hgnd is inevitably low, and the consumed current increases.

As an example of the configuration described above, if a leakage current of 200 μA flows between the terminals HVcc and Hgnd in the case where a voltage of 10 V is applied between the terminals HVcc and Hgnd based on the power source Vcc and a drive signal is not outputted from the terminal Hout. The impedance (first impedance) between the terminals HVcc and Hgnd becomes 10 V/200 μA=50 kΩ. In this case, it is desirable that the second impedance of the second impedance element 8 is less than 50 kΩ.

Figure 3:
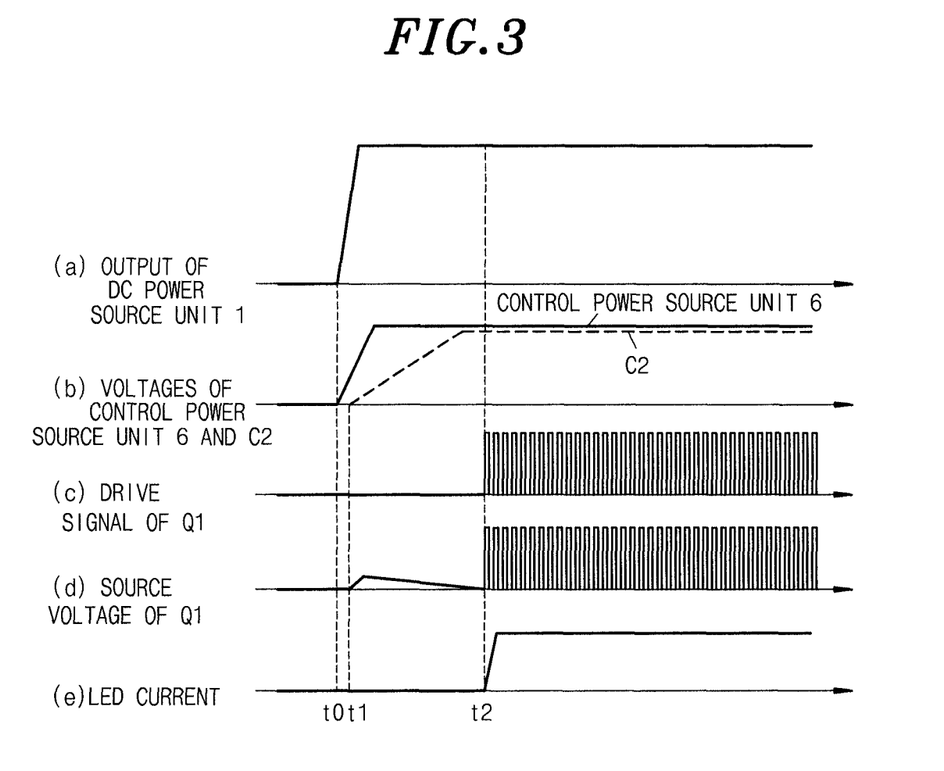
FIG. 3 is a timing chart showing an operation of the lighting device of the first embodiment.

FIG. 3 shows a waveform for each part of the lighting device 100A when the DC power source unit 1 is powered for the first time by referring to a timing chart showing the operation of the lighting device 100A of the first embodiment.

When the DC power source unit 1 is powered at time to, the voltage of the DC power source unit 1 is inputted as shown in (a) of FIG. 3. The voltage of the control power source unit 6 is generated according to the voltage of the DC power source unit 1 as shown in (b) of FIG. 3. At this time, the switching element Q1 has not yet started the on/off operation.

Here, when the switching element Q1 does not perform the on/off operation, the second impedance element 8 having a resistance component is arranged in a path in which the control capacitor C2 can be charged in DC from the control power source unit 6. More specifically, the current flows through the diode D2, the control capacitor C2 and the second impedance element 8 from the control power source unit 6.

Therefore, as shown by a dotted line in (b) of FIG. 3, the charging of the control capacitor C2 is started from time t1 when a little time has elapsed from time t0, and the voltage of the control capacitor C2 increases. Further, at this time, as shown in (d) of FIG. 3, the source voltage of the switching element Q1 has been slightly increased, but this is due to the leakage current of each part, and the source voltage of the switching element Q1 essentially remains at zero at this time.

At time t2 when a predetermined time has elapsed after the control power source voltage of the control power source unit 6 and the voltage of the control capacitor C2 exceed a predetermined voltage, as shown in (c) and (d) of FIG. 3, a drive signal is outputted from the drive unit 4 and the switching element Q1 is turned on and off repeatedly. The drive signal from the drive unit 4 is transmitted under the control of the control unit 5 and the timer unit 7. That is, after the control power source is supplied to the drive unit by the control power source unit 6, the timer unit 7 outputs to the control unit 5 a signal for controlling the on/off of the switching element Q1 after a predetermined time. In response to this, the control unit 5 outputs the control signal, and the drive unit 4 outputs the drive signal at time t2 in response to the input of the control signal.

As described above, the energy, which is stored in the inductor L1 while the switching element Q1 is turned on, is discharged when the switching element Q1 is turned off such that the diode D1 is electrically conducted. Accordingly, the source voltage of the switching element Q1 decreases to substantially zero voltage, thereby forming a waveform in which the switching element Q1 is turned on and off continuously in response to the drive signal as shown in (d) of FIG. 3. The control capacitor C2 is charged by the control power source unit 6 when the switching element Q1 is turned off during the on/off operation of the switching element. Then, with the start of the on/off operation of the switching element Q1, the current flows in the LED module 3 as shown in (e) of FIG. 3 and the normal operation is started.

Figure 4:
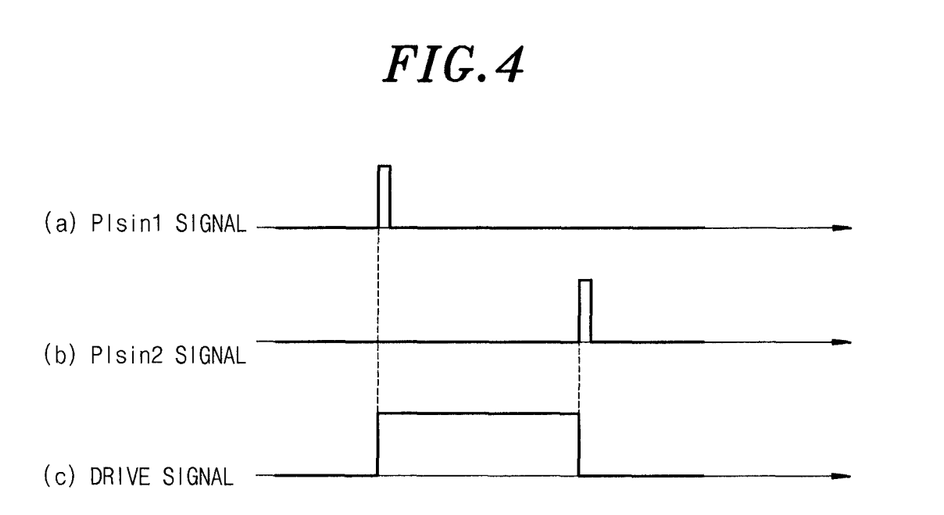
FIG. 4 is a timing chart of input and output signals of the drive unit.

FIG. 4 shows a timing chart of input and output signals of the drive unit 4 in the normal operation, wherein (a) of FIG. 4 shows an ON start signal (control signal) of the switching element Q1 which is inputted to a terminal Plsin1 from the control unit 5, and (b) of FIG. 4 shows an ON stop signal (control signal) of the switching element Q1 which is inputted to a terminal Plsin2 from the control unit 5. Consequently, as shown in (c) of FIG. 4, an ON signal of the switching element Q1 is generated and one period thereof corresponds to one pulse in (c) of FIG. 3.

In accordance with the above-described embodiment, it is possible to ensure the drive voltage of the switching element Q1 which requires a high drive voltage by a simple configuration of using a simple element such as the second impedance element 8. Further, there is provided a lighting device that requires no design change in resistance value even if the type of the load (LED module 3) is changed.

Further, the lighting device 100A in the present embodiment may be configured such that the LED module 3 is removably connected to the lighting device 100A.

Second Embodiment

Figure 5:
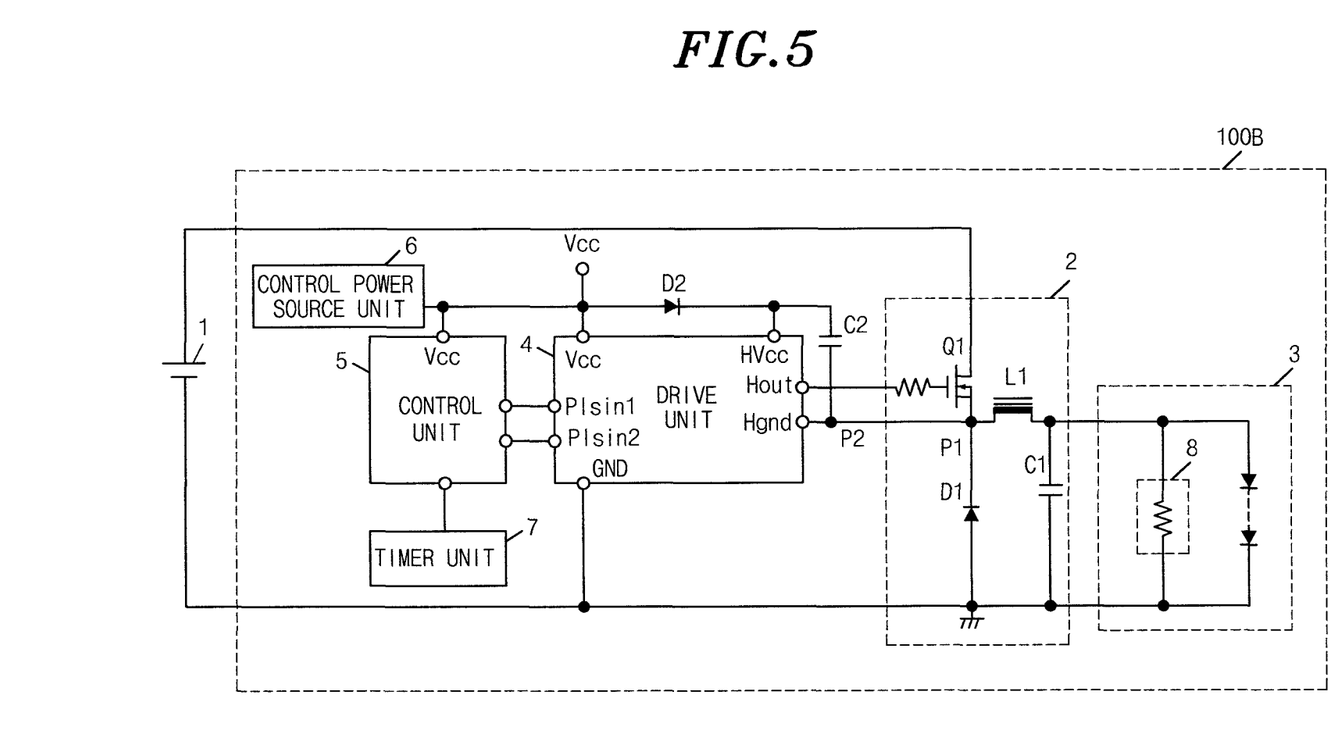
FIG. 5 is a circuit diagram of a lighting device in accordance with a second embodiment of the present invention.

FIG. 5 shows a circuit diagram of a lighting device 100B in accordance with a second embodiment of the present invention. Unlike the first embodiment, the second impedance element 8 is incorporated into the LED module 3.

Figure 6:
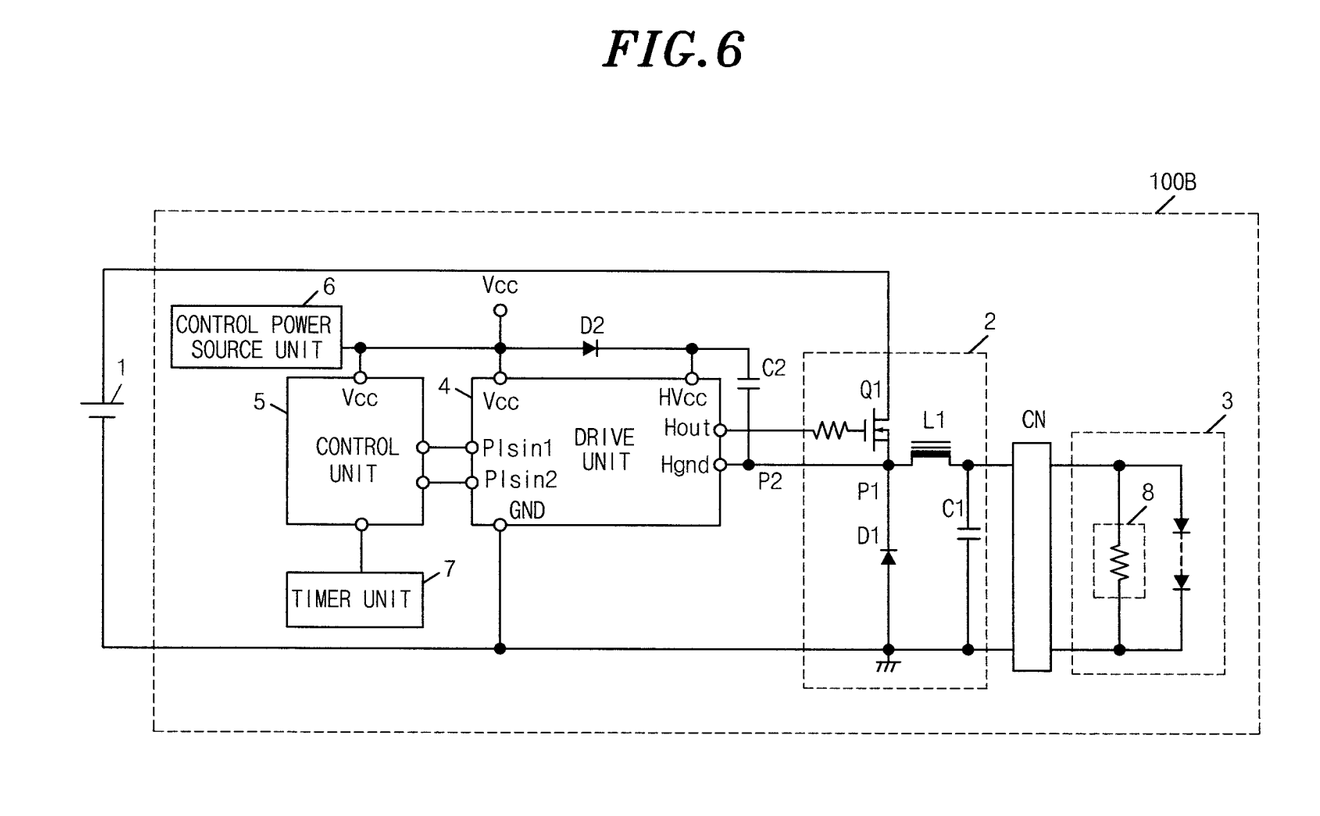
FIG. 6 shows a circuit diagram of a modification of the lighting device of the second embodiment.

Further, FIG. 6 shows a circuit diagram of a modification of the lighting device 100B of the second embodiment. In this modification, the second impedance element 8 is incorporated into the LED module 3, and the LED module 3 is connected to the rest of the lighting device 100B through a connector CN. In accordance with this configuration, when the LED module 3 is removed from the lighting device 100B, a drive signal is not outputted. Therefore, with a simple configuration and manipulation, it is possible to stop the operation of the lighting device 100B when the LED module 3 is removed.

Figure 7:
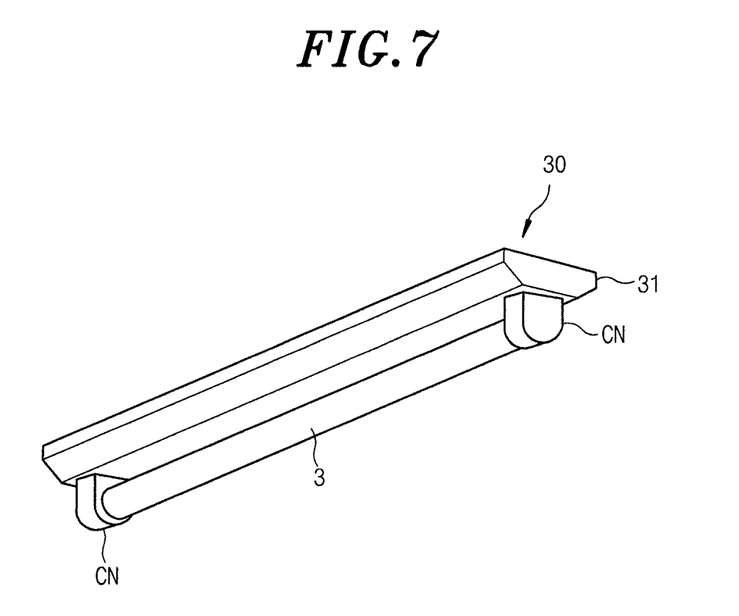
FIG. 7 is an example of an illumination apparatus including the lighting device.
Figure 8:
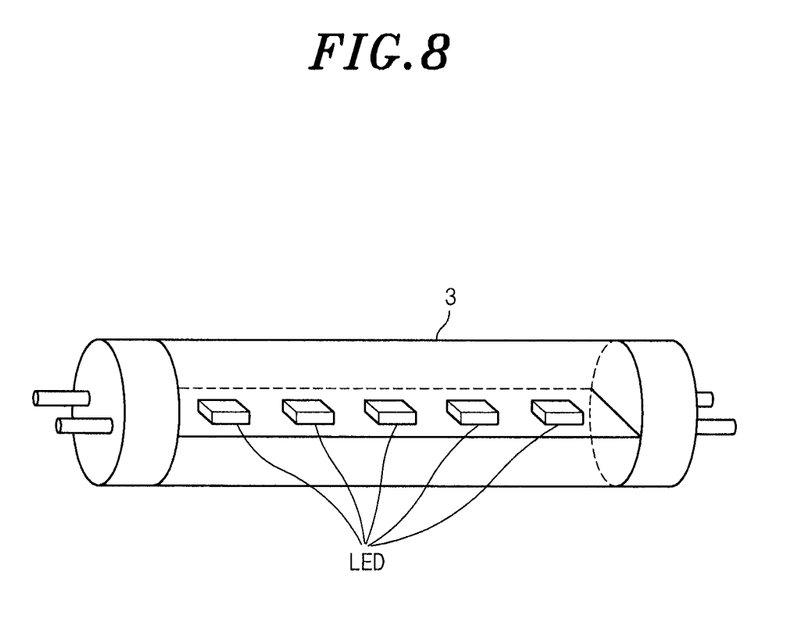
FIG. 8 shows an example of an LED module.

FIGS. 7 and 8 show an example of an illumination apparatus 30 including the lighting device 100A or 100B. The connector CN may be arranged so as to be connected to the LED module 3 at the outside of the lighting device 100A or 100B. A portion of the lighting device 100A or 100B other than the LED module 3 (for example, left-hand portion of the light device 100B shown in FIG. 6 from the connector CN) is accommodated in an apparatus main body 31 of an illumination apparatus 30 shown in FIG. 7.

The LED module 3 may be configured as shown in FIG. 8 so as to be connected to and inserted into the illumination apparatus 30. A plurality of LEDs may be mounted on a substrate and received in a housing having a light-transmitting property in substantially the same shape as a general discharge lamp.

Third Embodiment

Figure 9:
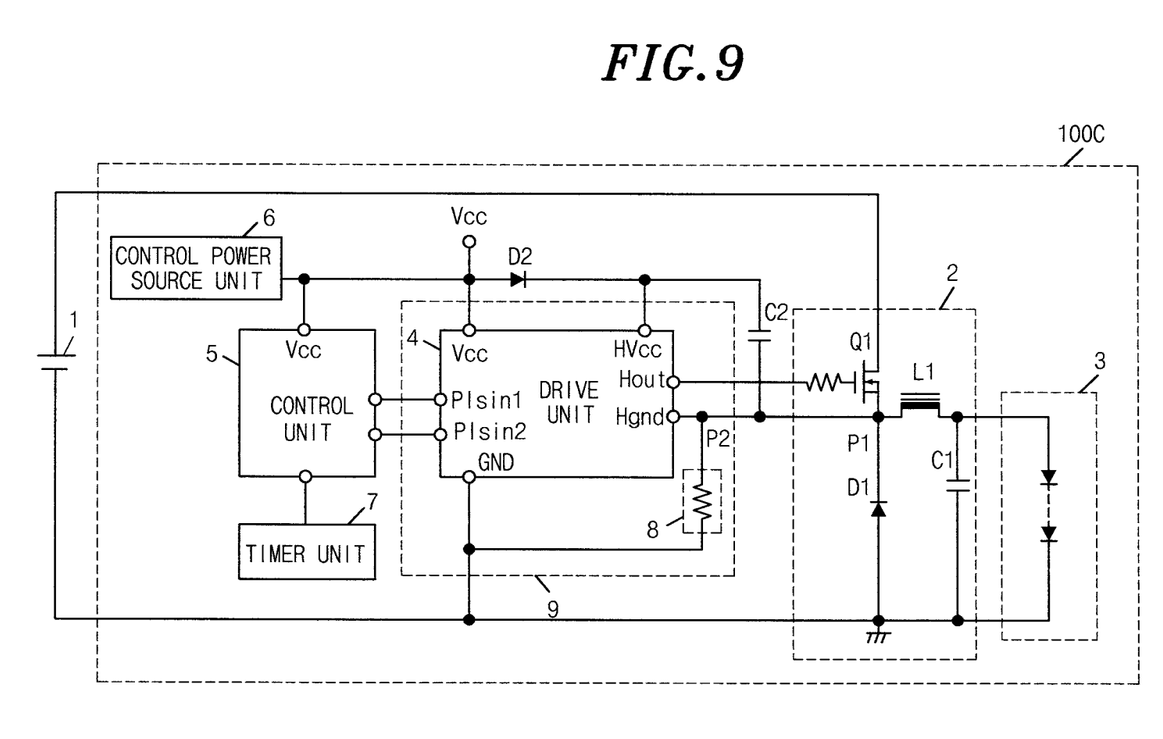
FIG. 9 is a circuit diagram of a lighting device in accordance with a third embodiment of the present invention.
Figure 10:
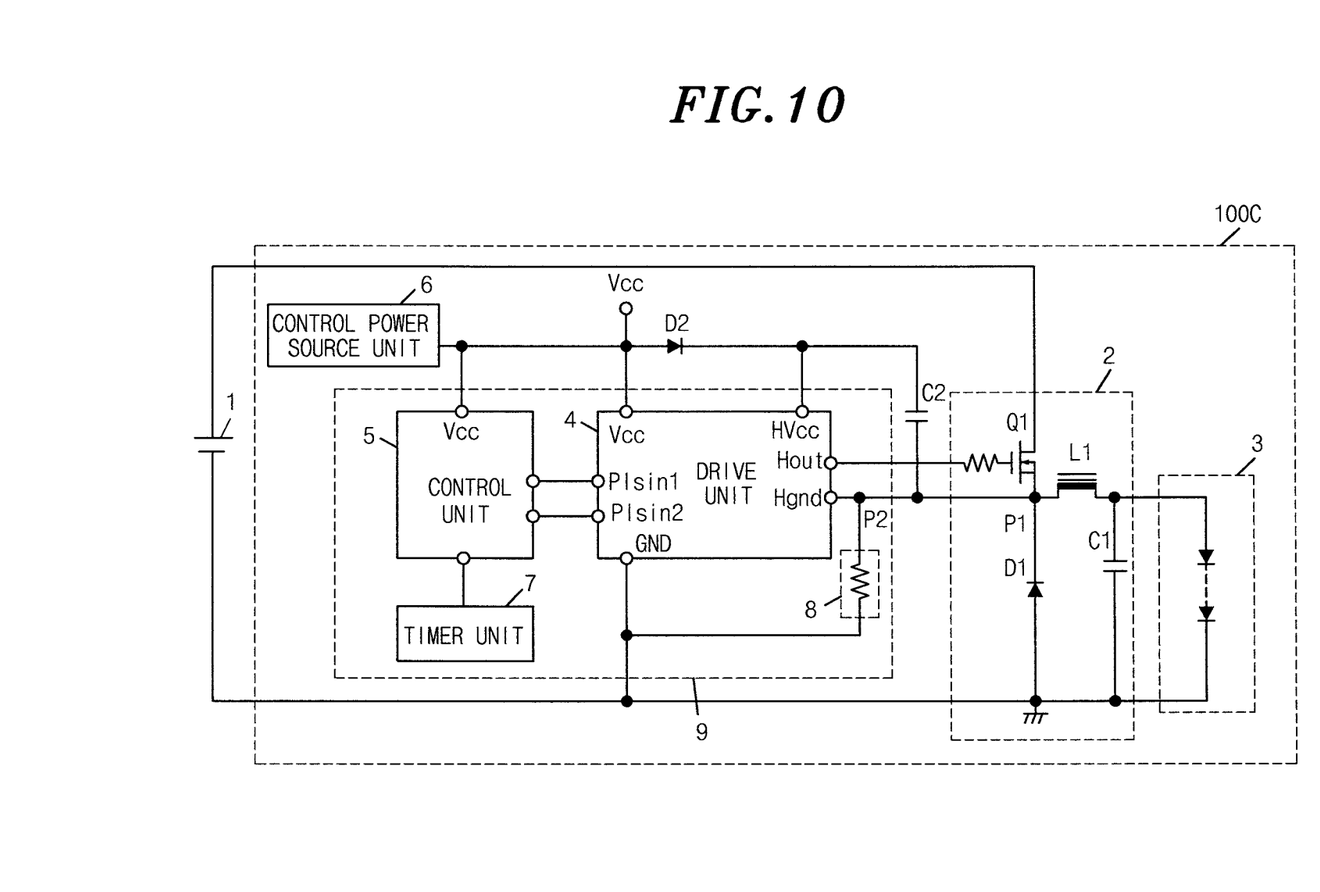
FIG. 10 shows a circuit diagram of a modification of the lighting device of the third embodiment.

FIG. 9 shows a circuit diagram of a lighting device 100C in accordance with a third embodiment of the present invention. Unlike the first embodiment, the drive unit 4 and the second impedance element 8 are formed integrally into a control integrated circuit 9. FIG. 10 shows a circuit diagram of a modification of the lighting device 100C of the third embodiment. In this modification, not only the drive unit 4 and the second impedance element 8, but also the control unit 5 and the timer unit 7 are formed integrally into the control integrated circuit 9.

Meanwhile, a threshold voltage VT for driving the switching element Q1 (MOSFET) for middle and high voltages greater than 200 V is set to be in a range from about 2 V to 4 V even though there is a difference in a commercially available element depending on the design of each manufacturer.

Further, depending on the design, there is difference in the current flowing through the LED module 3 (LED light source) for use in illumination. There is a possibility that a maximum current of about 1 A may be used. In order to supply such current to the LED module 3, the gate voltage applied to the gate of the switching element Q1 is required to be at least twice, preferably, three times, the drive threshold voltage VT.

In the embodiments described above, a case where the first impedance is greater than the second impedance has been described. Further, under the circumstances of the product described above, it is considered to more stably realize the control of the switching element Q1. Assuming that the power source Vcc is 10 V and the terminal HVcc is set to a voltage higher than 9 V (three times the drive threshold voltage VT of 3 V), the first impedance of the first impedance elements 10 is preferably greater than at least 10 times the second impedance of the second impedance element 8 (first operation>10× second impedance).

In addition, the present invention is not limited to the embodiments described above, and may be appropriately modified or improved. The materials, shapes, dimensions, numerical values, forms, numbers, arrangement places, and the like of the respective components are arbitrary as long as the present invention can be achieved, and are not limited.

While the invention has been shown and described with respect to the embodiments, it will be understood by those skilled in the art that various changes and modification may be made without departing from the scope of the invention as defined in the following claims.

What is claimed is:

1. A lighting device comprising:
    a voltage conversion circuit which is configured to be connected to an electrical light source turned on by a DC current and between output terminals of a DC power source unit, and includes at least a switching element connected to a positive potential side of the output terminals of the DC power source unit;
    a drive unit configured to output a drive signal for turning on and off the switching element to the switching element by controlling on/off of two switching elements connected in series in a half-bridge type inverter, wherein the drive unit has a first impedance element connected between the two switching elements with a first impedance which is determined based on a power consumed by the drive unit before a predetermined time has elapsed after a control power source is supplied to the drive unit for reducing a source potential of the switching element of the voltage conversion circuit at the start-up of the lighting device;
    a control capacitor connected between terminals of the drive unit and the source of the switching element so that a voltage charged in the control capacitor is used by the drive unit as power source, wherein the control capacitor is charged when the switching element is turned off during an on/off operation of the switching element; and
    a second impedance element with a second impedance having a resistance component, which is arranged in a path in which the control capacitor can be charged in DC at the start-up of the lighting device.

2. The lighting device of claim 1, wherein the second impedance element is connected to a connection point between the source of the switching element and an inductor.

3. The lighting device of claim 1, wherein at least the drive unit and the second impedance element are configured as a control integrated circuit.

4. The lighting device of claim 1, wherein the first impedance of the first impedance element is greater than the second impedance of the second impedance element.

5. The lighting device of claim 4, wherein the first impedance is at least 10 times greater than the second impedance.

6. The lighting device of claim 1, further comprising: the electrical light source, wherein the electrical light source is removably connected to the lighting device.

7. The lighting device of claim 1, further comprising: the electrical light source, wherein the electrical light source and the second impedance are included in a module to be removably connected to the lighting device.

8. An illumination apparatus comprising the lighting device described in claim 1.

9. A lighting device comprising:
    a voltage conversion circuit which is configured to be connected to an electrical light source turned on by a DC current and between output terminals of a DC power source unit, and includes at least a switching element connected to a positive potential side of the output terminals of the DC power source unit;
    a drive unit configured to output a drive signal for turning on and off the switching element to the switching element, wherein the drive unit has a first impedance element with a first impedance which is determined based on a power consumed by the drive unit before a predetermined time has elapsed after a control power source is supplied to the drive unit;
    a control capacitor for use in generating the drive signal, which is charged when the switching element is turned off during an on/off operation of the switching element; and
    a second impedance element with a second impedance having a resistance component, which is arranged in a path in which the control capacitor can be charged in DC when the switching element does not perform the on/off operation,
    wherein the first impedance is at least 10 times greater than the second impedance.

10. A lighting device comprising:
    an electrical light source turned on by a DC current;
    a voltage conversion circuit which is configured to be connected to the electrical light source and between output terminals of a DC power source unit, and includes at least a switching element connected to a positive potential side of the output terminals of the DC power source unit;
    a drive unit configured to output a drive signal for turning on and off the switching element to the switching element, wherein the drive unit has a first impedance element with a first impedance which is determined based on a power consumed by the drive unit before a predetermined time has elapsed after a control power source is supplied to the drive unit;
    a control capacitor for use in generating the drive signal, which is charged when the switching element is turned off during an on/off operation of the switching element; and
    a second impedance element with a second impedance having a resistance component, which is arranged in a path in which the control capacitor can be charged in DC when the switching element does not perform the on/off operation,
    wherein the electrical light source and the second impedance are included in a module to be removably connected to the lighting device.

* * * * *